Patented July 27, 1926.

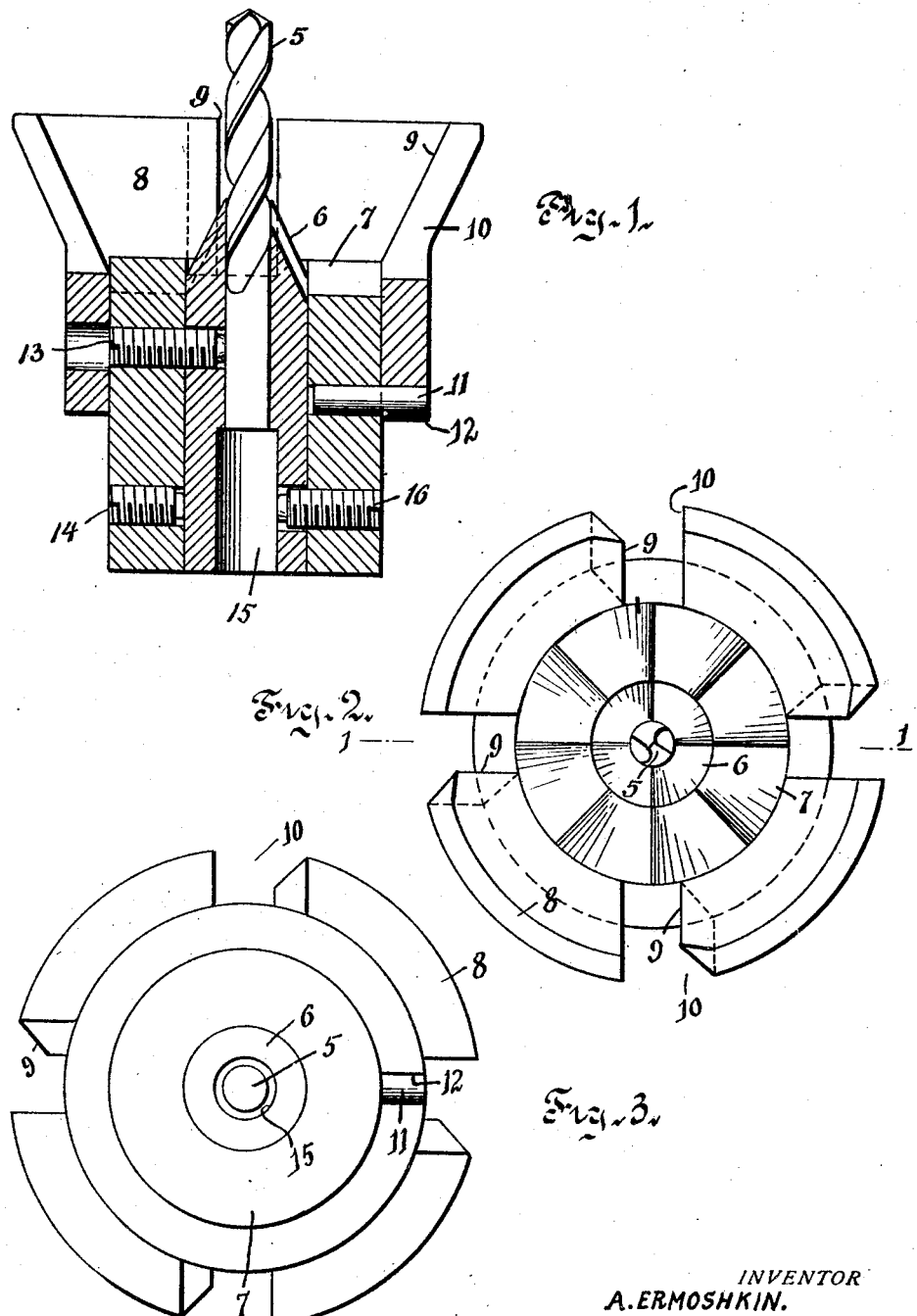

1,593,654

UNITED STATES PATENT OFFICE.

AVDEI ERMOSHKIN, OF BROOKLYN, NEW YORK.

COMBINATION WOODWORKING TOOL.

Application filed June 20, 1925. Serial No. 38,418.

My invention relates to a combination tool, particularly suitable for finishing the ends of bowling alley pins, and has reference more particularly to a combination tool, the different parts of which can each be easily sharpened and when so sharpened, can be easily assembled and their relation will remain such as to properly finish the lower end of a bowling alley pin.

In the appended drawing, forming part of this application,

Figure 1 is a vertical section on line 1—1, Figure 2;

Figure 2 is a top plan view of the tube embodying my invention; and

Figure 3 is a bottom plan view of same.

Referring to the drawings, 5 is a drill, the shank of which is secured in the bore of a counter-sink 6. The counter-sink 6 is in turn supported within the bore of a face cutter 7. The face cutter carries a bell shaped cutter 8 which has a plurality of cutting edges 9, projecting above the face cutter to finish the lateral face of the bowling alley pin near the bottom, which bottom is finished by the face cutter.

The bell shaped cutter 8 is maintained in the desired position on the face cutter 7 by a pin 11 which forms a rest for a cut-out 12 in the bell shaped cutter 8. This cylindrical portion encloses the upper part of the face cutter and the pin 11 therein serves as a driver for the bell shaped cutter, but in addition thereto, a set screw is provided for locking the bell cutter 8 to the face cutter 7. This set screw is not shown in the drawings.

The counter-sink 6 extends through the entire length of the face cutter 7 and projects the desired distance above, and this position is controlled by a set screw 13 which serves to lock the drill 5 in the counter-sink 6. In addition, this set screw 13 serves as means for interlocking the face cutter with the counter-sink. A set screw 14 is provided in the face cutter for locking the counter-sink to the face cutter. The counter-sink 6 has at the rear end thereof an enlarged portion 15 which is adapted to fit a late spindle or a motor shaft, as the case may be, and to which the combination tool may be secured by means of a set screw 16.

The drill 5 projects out of the counter-sink and extends out of the bell shaped cutter 8. This drill serves as a pilot for the combination tool.

From the above description, it will be seen that the four tools forming the single tool can each be independently sharpened and the various set screws serve, in addition to securing the tool in their proper relations, as means of interlocking the various tools so as to provide a more solid combination tool for finishing the lower ends of bowling alley pins.

I claim:

1. A combination tool comprising a drill, a counter-sink on said drill to counter-sink the hole made by the drill, a face cutter on the counter-sink to finish the surface where the counter-sink is formed, a bell shaped cutter on said face cutter to finish the lateral surface about the face, and means for securing said drill, counter-sink, face and bell cutters together, to revolve as a unit.

2. A combination tool comprising a counter-sink, a drill, said counter-sink having a bore to engage a spindle or shaft, a face cutter secured to the counter-sink, and a bell shaped cutter secured to the face cutter, and means for securing said drill, countersink, and face and bell cutters together, to revolve as a unit, and said drill when secured being adapted to project out of the counter-sink and bell shaped cutter and serve as a pilot for the combination.

AVDEI ERMOSHKIN.